Jan. 6, 1942.　　G. C. SCHAUB ET AL　　2,268,905
PRODUCTION OF SOLID CHILLED EDIBLE PRODUCTS
Filed June 30, 1939　　5 Sheets-Sheet 1

INVENTORS
GORDON C. SCHAUB
JACOB SCHAUB
BY
ATTORNEY

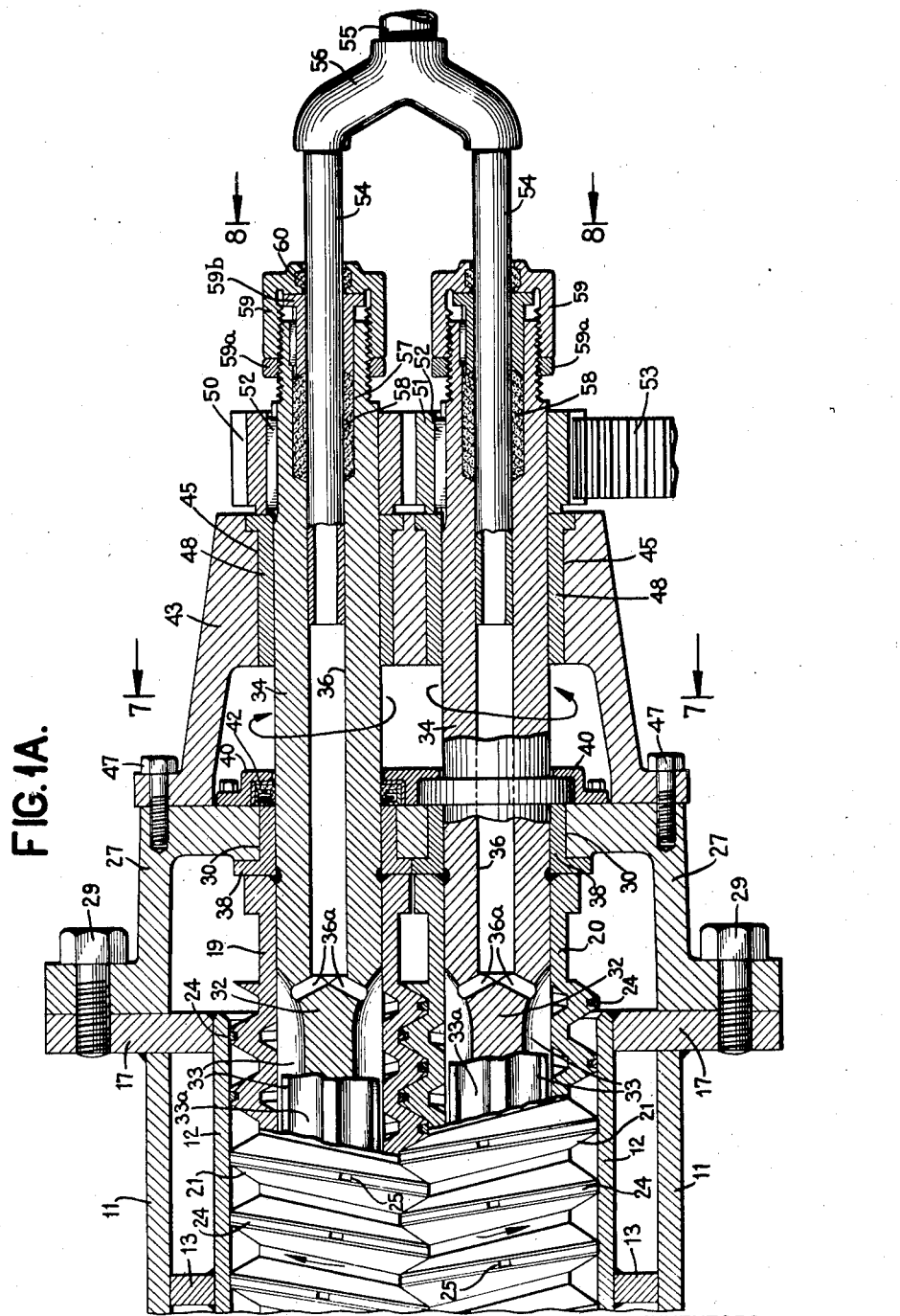

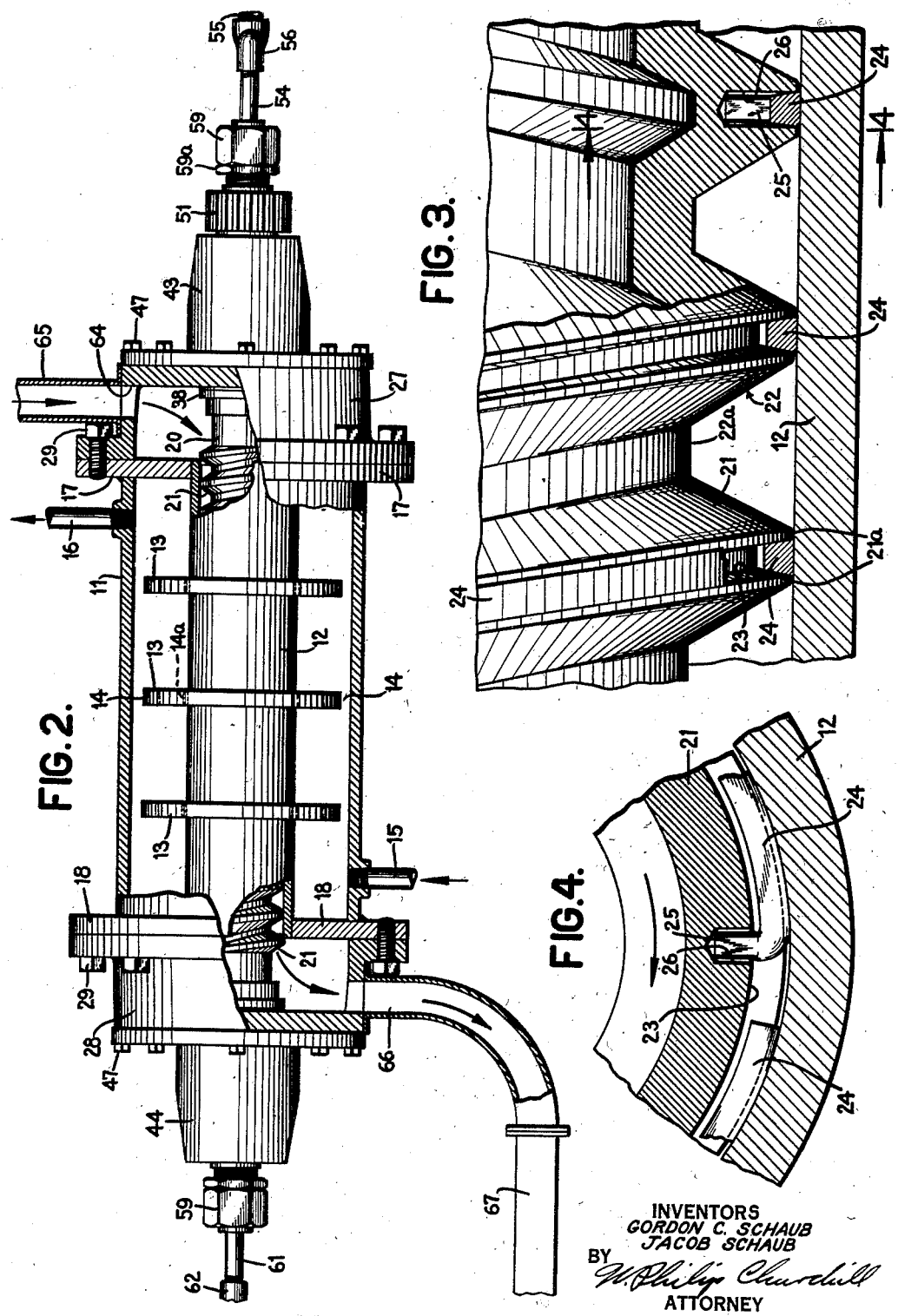

Jan. 6, 1942.  G. C. SCHAUB ET AL  2,268,905
PRODUCTION OF SOLID CHILLED EDIBLE PRODUCTS
Filed June 30, 1939   5 Sheets-Sheet 4
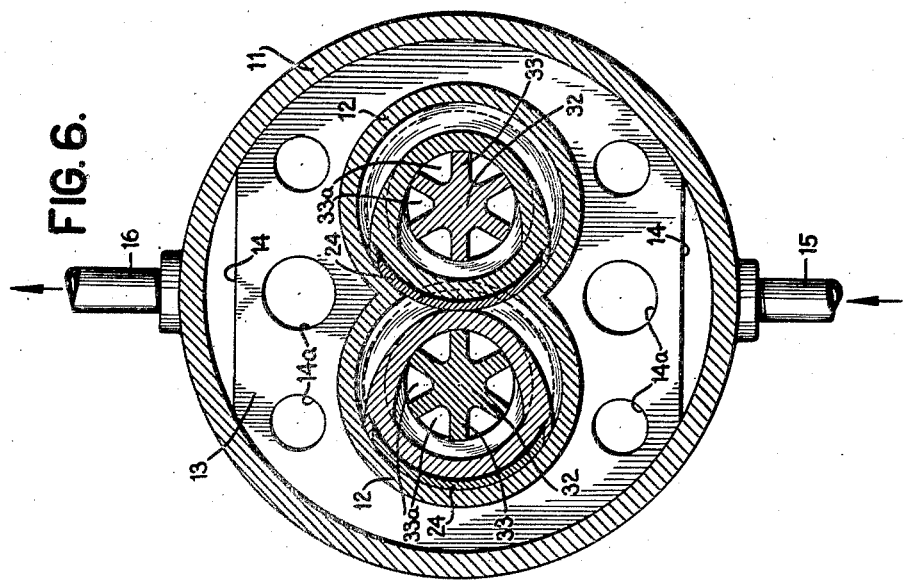
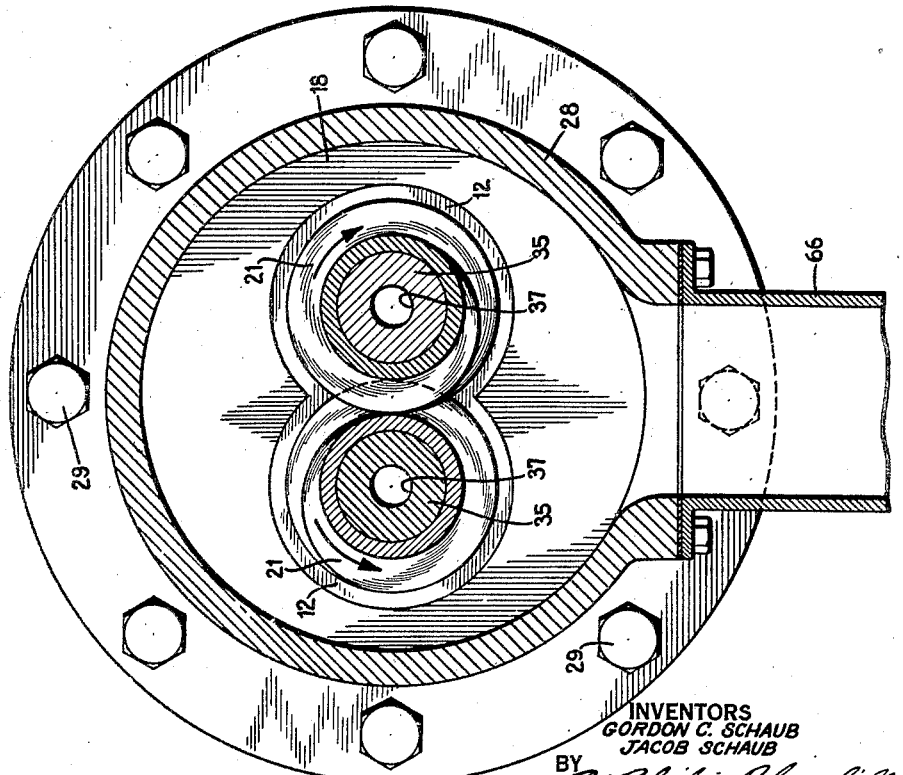
INVENTORS
GORDON C. SCHAUB
JACOB SCHAUB
BY *W. Philips Churchill*
ATTORNEY Jan. 6, 1942. G. C. SCHAUB ET AL 2,268,905
PRODUCTION OF SOLID CHILLED EDIBLE PRODUCTS
Filed June 30, 1939 5 Sheets-Sheet 5

INVENTORS
GORDON C. SCHAUB
JACOB SCHAUB
BY
ATTORNEY

Patented Jan. 6, 1942

2,268,905

UNITED STATES PATENT OFFICE 2,268,905

PRODUCTION OF SOLID CHILLED EDIBLE PRODUCTS

Gordon C. Schaub, Bayonne, and Jacob Schaub, Westfield, N. J., assignors to The Best Foods, Inc., New York, N. Y., a corporation of Delaware Application June 30, 1939, Serial No. 282,020

6 Claims. (Cl. 62—114)

This invention relates to a method and apparatus for chilling liquids to produce solid edible products such as margarine, shortening compounds and the like.

In the manufacture of margarine as heretofore practiced, the emulsion of oil and water has been chilled in a thin layer on the surface of a chilled roll, the solidified crystals being scraped from the roll, collected in a mass and worked into the final product. In order to obtain the proper texture in the finished product avoiding a coarse or grainy texture, it has been necessary to work over the chilled crystals by kneading them and intermixing them extensively. It has also been necessary to allow batches of the worked material to stand without working for a period of time, known as "resting" the material. Such a process consequently has been discontinuous in order to obtain a high quality product. This invention makes it possible to produce continuously a high quality margarine in a very economical manner and with a minimum of effort.

It is an object of this invention to provide a process and apparatus for simultaneously chilling and working or rubbing a liquid and the solid or semi-solid material resulting from chilling such liquid so that a finished product is obtained in a single operation.

Another object of the invention is to provide chilling apparatus which will not clog or be rendered temporarily inoperative by liquid hardening therein during the chilling operation, but which will forcibly expel the congealed material therefrom.

A further object of our invention is to make margarine and other related chilled solid products continuously by passing the ingredients through apparatus acting as a combined pump and freezer.

A further object is to provide apparatus for chilling and congealing liquids continuously which is self cleaning and which may be stopped for a period of time and restarted without the necessity of warming the apparatus to clean out hardened material therein.

Another object is the provision of apparatus for making margarine and related chilled products continuously in which the liquid to be chilled may be fed to the apparatus by gravity.

The invention will be described in connection with the embodiment thereof shown in the accompanying drawings, in which—

Figures 1 and 1A together represent a horizontal sectional view through approximately the center of the chilling and working apparatus.

Figure 2 is a side elevation of this apparatus on a smaller scale with portions thereof broken away to show the interior construction.

Figure 3 is a fractional detail view on an enlarged scale partly in elevation and partly in section illustrating a portion of one of the rotors.

Figure 4 is a fractional vertical sectional view taken on the line 4—4 of Figure 3.

Figure 1:
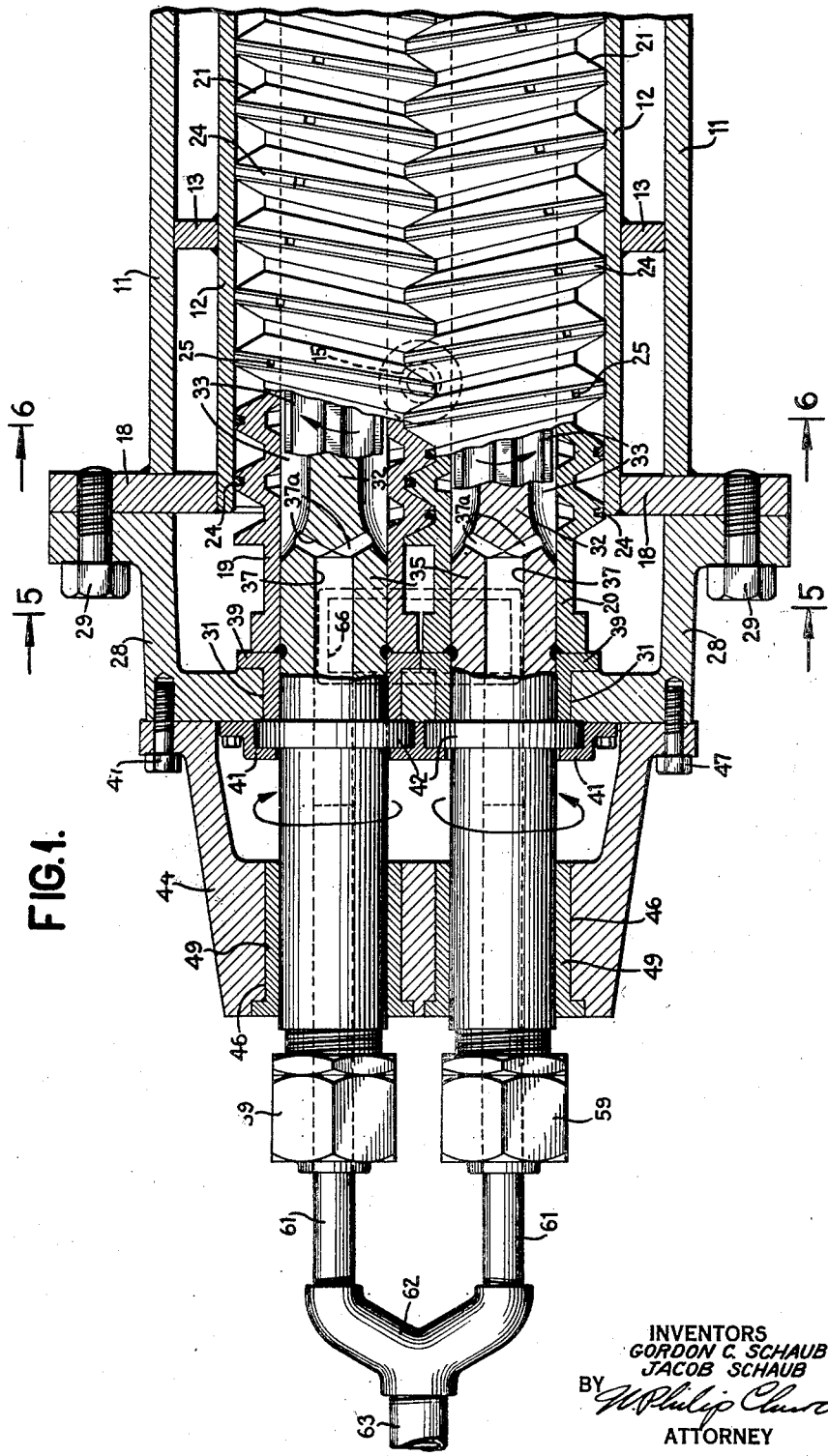

Figures 5 and 6 are vertical sectional views taken on the lines 5—5 and 6—6 respectively of Figure 1.

Figure 7:
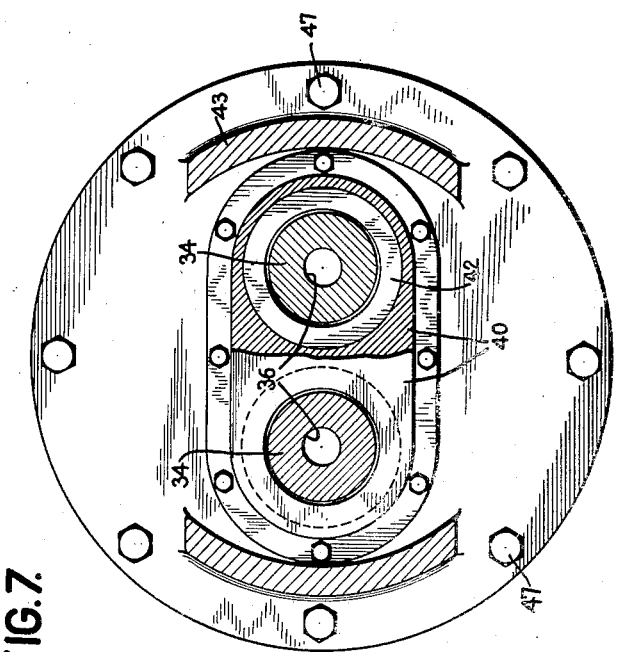

Figure 7 is a vertical sectional view taken on the line 7—7 of Figure 1A.

Figure 8:
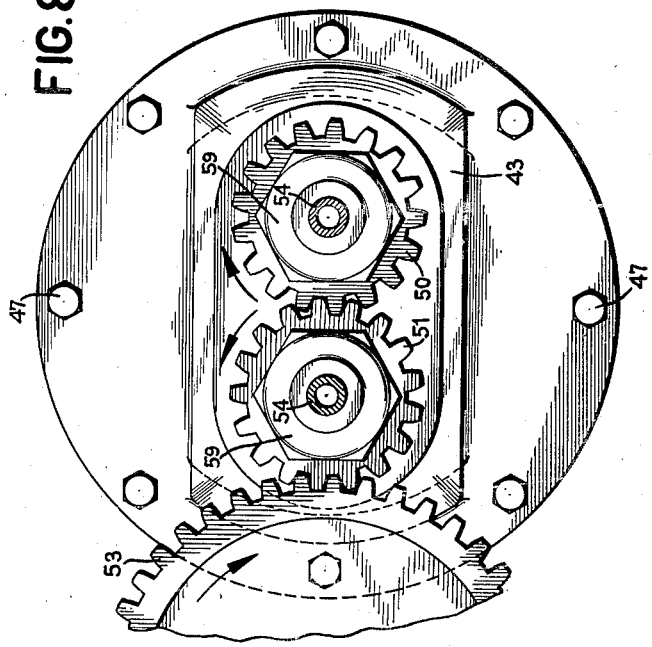

Figure 8 is an end elevation of the apparatus taken on the line 8—8 of Figure 1A.

Figure 9:
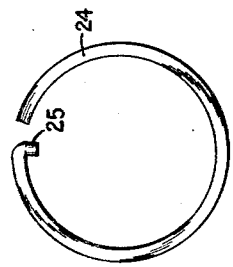

Figure 9 is a plan view of one of the scraping rings used on the rotors.

Figure 10:
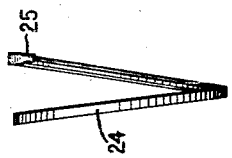

Figure 10 is a side elevation of one of the scraping rings.

The apparatus comprises a combination pump and chilling unit made up of an outer substantially cylindrical casing 11, and an inner casing 12 spaced therefrom, the casing 12 being in the shape of a pair of parallel intersecting cylinders (Figures 5 and 6). Inner casing 12 is held in fixed relation within the outer casing 11 by a series of spaced plates 13 welded or otherwise secured to casing 12 and which contact the inner surface of the casing 11. Plates 13 are preferably spaced from the top and bottom of the casing 11 as at 14 and may be provided with openings 14a to permit circulation of a refrigerant longitudinally of the apparatus within the space between casings 11 and 12. Such refrigerating fluid may be introduced into this space through the inlet pipe 15 and withdrawn through pipe 16. The space between casings 11 and 12 may be closed at the ends by suitable annular plates 17 and 18 welded or otherwise secured in fluid-tight fashion to the outer surface of casing 12 near the ends thereof and to the ends of casing 11.

Within the casing 12, a pair of rotors 19 and 20 may be arranged to fit snugly for rotation in opposite directions with the worm flights 21 meshing with each other. These rotors are preferably of complemental construction, each being provided with wedge-shaped spiral worm flights 21 having complemental grooves 22 therebetween. The grooves 22 between the worm flights 21 preferably have relatively flat inner surfaces 22a. The outermost portions of the worm flights 21 may have narrow flat surfaces 21a defining the grooves 23 which are constructed to receive series of scraping rings 24. While a single scraping ring could be provided for each rotor, we prefer to use a plurality of successive rings, arranged end to end in the grooves 23 and each ring extending about one revolution around the rotor. These rings may be wedge-shaped in cross section and are preferably made of spring steel with inwardly extending hooks 25 on their ends that extend forward in the direction of rotation of the rotors. The hooks 25 may be received in suitable notches 26 provided at regular intervals around the grooves 23. The rotors 19 and 20 preferably are longer than the casing 12 and extend some distance into the housing 27 at the inlet end of the machine and into the housing 28 at the outlet end of the machine.

Housings 27 and 28 may be secured to outwardly extending portions of the annular plates 17 and 18 by bolts 29 or other suitable means. Openings 30, 31 are provided in these housings to receive the ends of the rotors 19 and 20. If desired, the rotors 19 and 20 may be of one piece construction either solid or hollow. We prefer, however, to make the rotors 19 and 20 of a hollow construction for the internal circulation of cooling fluid by providing suitable core members 32 sealed within the rotors.

The core members 32 may be of identical construction comprising the shaft sections 34 and 35 at the ends provided with central openings 36 and 37. The core members 32 fit snugly within the rotors 19 and 20 and may be secured in place as by welding these parts together as a single assembly. Bushing members 38 and 39 are seated in the openings 30 and 31 in the housings 27 and 28 to support the shaft sections 34 and 35. In order to prevent leakage of material from the space within the housings 27 and 28, suitable stuffing box plates 40 and 41 may be bolted to the outer surface of housings 27 and 28 around openings 30 and 31 to hold suitable packing glands 42 surrounding the shaft sections 34 and 35 against the ends of bushing members 38, 39.

The central portions of core members 32 may be formed with radial longitudinally extending spokes 33 leaving spaces 33a therebetween for the circulation of cooling fluid. The spaces 33a may be connected to central openings 36, 37 in the end sections 34, 35 by means of the holes 36a and 37a.

To support the end shaft sections 34, 35 in better fashion for rotation, bearing supports 43 and 44, provided with suitable openings 45 and 46 for the end sections 34, 35, may be bolted to the ends of housings 27, 28 by means of the bolts 47. Suitable bushings 48 and 49 may be fitted into the openings 45 and 46 to provide bearings for the shaft sections 34, 35 of the rotors 19 and 20. The rotors 19 and 20 may be driven by the gears 50 and 51 meshing with each other and splined or otherwise secured as by the keys 52 to the outer ends of shaft sections 34 outside of the bearing support 43. Main drive gear 53 may be arranged to drive gear 51 from a suitable source of power (not shown), thus rotating the two rotors 19 and 20 in opposite directions.

In order to supply cooling fluid to the interior of the rotors 19 and 20, the pipes 54 may be arranged to extend part way into the openings 36 in the shaft sections 34. Pipes 54 may be supplied from a common source with cooling fluid through pipe 55 and the Y connection 56. To avoid leakage of cooling fluid, end sections 34 may be provided with enlarged openings 57 at their ends filled with suitable packing material 58. The end sections 34 may also be threaded to receive the hollow nuts 59 and lock nuts 59a which press the bushings 59b splined to end sections 34 against the packing material 58. Lubricating means 60 may be provided in a hollow portion of the nuts 59. Thus the shaft sections 34 are allowed to rotate about the pipes 54 without loss of liquid.

The cooling fluid from the interior of the rotors 19 and 20 may be withdrawn through the pipe sections 61, the Y connection 62, and pipe 63 which are associated with the ends of the shaft sections 35 with suitable packing glands held in place by the nuts 59 and 59a as described above for the shaft sections 34.

Housing 27 may be provided with an opening 64 to which a pipe 65 is connected for feeding into the apparatus by gravity the margarine emulsion or other liquid to be chilled. The hardened or chilled material leaving the apparatus is forced under pressure by the rotors into the housing 28 from which it is discharged through the outlet 66. Associated with the outlet 66, a template or shaping nozzle 67 may be employed so that in the case of solid plastic material issuing through the outlet 66, such material will be shaped in the form of a long bar which may be immediately cut into sections and packaged.

In the operation of the machine, the cooling fluid, which may be brine, ammonia or other refrigerant, is circulated through the space between the casings 11 and 12, being introduced through pipe 15 and withdrawn through pipe 16. Simultaneously, this same or some other refrigerant is introduced into the interior of the rotors 19 and 20 through the pipe 55, pipe 54, the longitudinal openings 36, the openings 36a and thus along the inside of the central section of the rotor between the spokes 33. This refrigerant is withdrawn through the openings 37a, 37, the pipes 61 and the pipe 63. The emulsion or other liquid to be chilled or hardened is fed into the housing 27 through the pipe 65 and inlet opening 64. This material may simply be flowed into the housing by gravity and does not have to be forced under pressure. In preparing margarine, this liquid may consist of an emulsion of oil and water together with salt in the proportions desired in the final product.

The rotors 19 and 20 are rotated in opposite directions, as indicated in Figure 8, by means of the gears 50, 51 driven by the gear 53. As the rotors rotate, the emulsion introduced into the housing 27 is picked up by the worm flights 21 of the rotors 19 and 20 and is immediately trapped in the grooves 22 of the rotors and carried into the casing 12. This emulsion is rapidly chilled, heat being withdrawn through the casing 12, and also through the walls of the rotors 19 and 20. The walls of these rotors are of substantially uniform thickness and present a very large cooling surface to the material to be chilled. As the material is chilled, it solidifies and any solid material adhering to casing 12 is immediately scraped from the inner surface of the casing by the corkscrew scraping action of the rings 24. Any solid material adhering to the surfaces of one of the rotors 19 and 20 is also removed by contact with the other rotor. The liquid together with the solid material is subjected continuously to a rolling, rubbing or crushing action between the worm flights 21 of one rotor and the grooves 22 of the other rotor. This squeezing of the material between the surfaces of the rotors provides a working or rubbing action on the material as fast as it solidifies, which gives a thin, smooth homogeneous texture to the substantially solid material delivered to housing 28 by the rotors at the other end of casing 12.

Since the solid chilled material is forced into the housing 28 by the rotors, it is forcibly ejected through the outlet opening 66 and the shaping nozzle 67 by the pressure on it from the rotors. No opportunity is afforded for any air pockets to form in the material, and by properly controlling the temperature of the refrigerants in the apparatus, the material may be delivered through the forming nozzle 67 at any desired degree of hardness.

It will be seen that by reason of the action of the meshing flights of the rotors and the scraping action of the rings 24, the apparatus is entirely self cleaning and is not subject to becoming clogged by solidification of the material being chilled. The volume of the machine may be suitably adjusted by regulating the speed of rotation of the rotors and correlating the temperature and rate of circulation of the cooling fluid in accordance with the volume of material being chilled. The apparatus is capable of being run very slowly, or it may be run at a rapid rate, depending upon the length of the cooling chamber. The capacity of the machine is thus exceedingly flexible, and if it should be necessary to stop the operation of the machine for a period of time, it may be readily started again without requiring dismantling and cleaning of the machine.

By reason of the extensive cooling surfaces provided by casing 12 and the helical surfaces of the worm flights 21, an exceedingly high ratio of cooling surface to volume of liquid being chilled is provided. It is thus possible to obtain a very rapid chilling and hardening of liquids even though the length of the chilling chamber is relatively short. It will be apparent that any suitable number of rotors may be employed in accordance with our invention, two such rotors being shown only by way of illustration. The exact form of the worm flights 21 illustrated is preferable, although not essential since the worm flights may be made in other shapes complemental to each other to provide a similar action. The worm flights do not have to be of exactly complemental construction although the more accurately they are fitted together, the more satisfactory pumping action is produced by them. If the rotors fit together or in the casing 12 rather loosely, it may be necessary to introduce the liquid to be chilled under pressure. It will be understood that the apparatus described is capable of producing various chilled solid products other than margarine.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In apparatus for chilling a liquid to produce a solid edible product, a chilling chamber, means for introducing liquid to be chilled into said chamber, and a plurality of members within said chamber for kneading and rubbing congealed material and liquid, said members having relatively flat outer surfaces coacting to remove congealed material continuously from the surfaces of each other and having means pressed resiliently against the surface of said chamber to scrape material therefrom.

2. In apparatus for chilling a liquid to produce a solid edible product, a chilling chamber, means for introducing liquid to be chilled into said chamber, and a pair of rotors within said chamber having irregular complemental surfaces for moving liquid and congealed material through said chamber without substantial accumulation of congealed material on said rotor surfaces, said irregular complemental surfaces comprising meshing screw threads tapered in thickness in a direction radially outward and having substantially flat outer surfaces.

3. In apparatus for chilling liquid to produce a solid product, a chilling chamber, a pair of worms arranged for rotation in opposite directions within said chamber and meshing with each other to free the surfaces thereof from congealed material, and driving means for rotating said worms carrying radially expandible means resiliently pressed against the walls of said chamber to scrape congealed material therefrom.

4. Apparatus for congealing a liquid to produce a solid product comprising a chamber, means for cooling said chamber, means for introducing liquid to be congealed into said chamber, a plurality of self cleaning rotors arranged for rotation within said chamber for forcing liquid and congealed material therethrough, and means connected to said chamber for shaping congealed material as it is expelled from said chamber by said rotors, said rotors carrying radially expandable elongated scraper blades for removing congealed material continuously from the walls of said chamber.

5. In apparatus of the character described, a plurality of rotors provided with screw threads, an elongated housing forming a chamber corresponding generally to the shape of said rotors, grooves formed in the outer surfaces of said screw threads, and radially expandible scraper means for scraping the inner walls of said chamber carried by said rotors in said grooves.

6. In apparatus of the character described, a plurality of rotors provided with screw threads, an elongated housing forming a chamber corresponding generally to the shape of said rotors, grooves formed in the outer surfaces of said screw threads, and helical scraper blades carried in said grooves having their forward ends positively connected to said rotors for rotation therewith.

GORDON C. SCHAUB.
JACOB SCHAUB.

CERTIFICATE OF CORRECTION.

Patent No. 2,268,905.　　　　　　　　　　　　　　　January 6, 1942.

GORDON C. SCHAUB, ET AL.

It is hereby certified that error appears in the printed specification of the above numbered patent requiring correction as follows: Page 3, second column, line 11, claim 1, after "scrape" insert --congealed--; and line 31, claim 3, after "worms" insert --, said worms--; and that the said Letters Patent should be read with this correction therein that the same may conform to the record of the case in the Patent Office.

Signed and sealed this 3rd day of March, A. D. 1942.

Henry Van Arsdale,
(Seal)　　　　　　　　　　　　　　　　　　Acting Commissioner of Patent